Oct. 28, 1924.
W. R. RUTHERFORD
PULLING DEVICE
Filed July 17, 1923
1,513,185
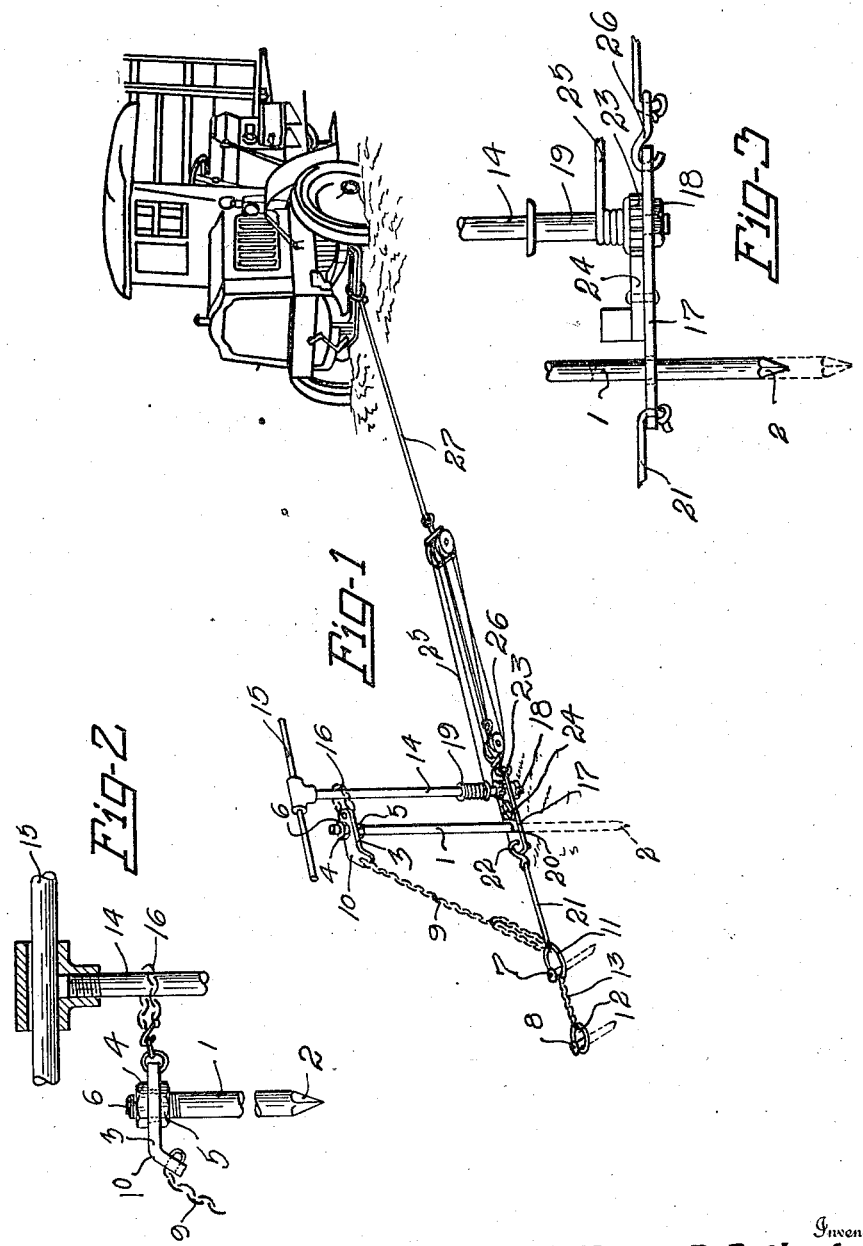
Inventor
William R. Rutherford
By Herbert E. Smith
Attorney Patented Oct. 28, 1924.

1,513,185

UNITED STATES PATENT OFFICE.

WILLIAM R. RUTHERFORD, OF SPOKANE, WASHINGTON.

PULLING DEVICE.

Application filed July 17, 1923. Serial No. 652,018.

*To all whom it may concern:*

Be it known that I, WILLIAM R. RUTHERFORD, a citizen of the United States, residing at Spokane, Spokane County, and State of Washington, have invented certain new and useful Improvements in Pulling Devices, of which the following is a specification.

My present invention relates to improvements in pulling devices especially designed for use in pulling or extricating automotive vehicles from stalled positions, but applicable for use in various other ways.

The primary object of my invention is the provision of portable means which may be compactly arranged and stored away when not in use, and which, when needed, may be erected and assembled with facility and convenience, and operated with comparatively little labor.

The invention consists in certain novel combinations and arrangements of parts whereby the device may be anchored in stable position and manipulated or operated to perform its required functions with facility and the expenditure of comparatively slight power.

In the accompanying drawings I have illustrated one complete example of the physical embodiment of my invention wherein the parts are combined and arranged according to the best mode I have thus far devised for the practical application of the principles of my invention.

Figure 1 is a perspective view showing the device erected and in operative position for extricating a stalled motor truck.

Figure 2 is an enlarged detail view, partly in section, showing the relation of the winding shaft and supporting means therefor.

Figure 3 is an enlarged, detail view showing the connection between the winding shaft and post, at their lower ends.

In the preferred form of my invention I utilize an anchoring post 1, which may be of metal pipe of suitable size and length, which is provided with a sharpened or pointed end 2 in order that the post may be sunk into the ground when used, and stand erect, as indicated in Fig. 1.

At its upper end the post is provided with a horizontally disposed head 3, in the form of a flat, perforated, metal plate, which, by means of the locking nuts 4 and 5 above and below the head, is locked on the threaded end 6 of the post.

A pair of auxiliary anchoring stakes or spikes 7 and 8 are employed in connection with the post, which are driven into the ground and alined with the post as indicated. By means of a diagonally disposed brace chain 9, which is attached to a perforated flange 10 of the head 3, and a ring 11 over one of the stakes as 7, the post is held, at its upper and, against strains or pulls. A second ring 12 is connected to the first ring 11 by means of the short extension chain 13, and the rings 11 and 12 used on the respective stakes 7 and 8, as illustrated, serve as an anchorage for the brace chain 9.

The pulling device includes a vertically disposed, rotatable shaft or bar 14, located adjacent to and parallel with the post, and provided with handle bars 15 at its upper end. A looped chain 16, which is attached to the head 3, is passed around the shaft near its upper end, to retain the shaft and perform the functions of a bearing. At its lower end the shaft is journaled in a base plate 17, perforated for the shaft, and a lock nut 18 on the lower end of the shaft below the base plate prevents displacement of the shaft. A reel or drum 19 is fixed to revolve with the shaft, and located above the base plate 17.

The base plate is perforated at 20 for the accommodation of the post 1 which is passed through the plate, and the plate is thus anchored to the post. An additional anchoring means for the base plate or bearing plate is provided through the medium of a horizontally disposed link 21, pivoted at one end to the ring 11, and at its other end provided with a brace hook 22 engaged in an opening in the end of the base plate or bearing plate.

A ratchet wheel 23 is carried by the shaft, and a pawl 24 pivoted on the bearing plate is utilized in connection with the ratchet wheel to prevent reverse movement of the shaft and to hold said shaft in position when desired, as usual.

As shown in Fig. 1 a block and tackle, or other suitable connection is made between the motor truck, automobile, or other vehicle, and the cable 25 is connected to the drum 19. The tackle is connected to the bearing plate by a hook as 26, and to a suitable element of the vehicle by means of a cord or cable 27, and as illustrated in Fig. 1, by turning the shaft 14, power is exerted to extricate the vehicle from its stalled position.

When not in use the several elements of the device may be compactly arranged for storing in or on the vehicle, in such place where they may readily be accessible for use when needed.

When the parts are assembled and erected as in Figure 1, the anchoring and supporting means as described afford a rigid and stable structure to resist the strain thereon when the vehicle is pulled, due to rotation of the shaft 14. The handle bar 15 is located at a convenient height for manipulation by the operator, and the drum or reel 19 which is of small diameter compared with the length and leverage of the handle bar 15, exerts its power, as it is turned to wind the cable 25 and draw or pull the vehicle toward the pulling device, as indicated.

From the above description taken in connection with my drawings, it will be apparent that I have provided a device of this character which fulfills the requirements of a comparatively perfect mechanism for performing its functions in an efficient manner and with facility.

Having thus fully described my invention, what I claim as new and desire to secure by Letters Patent is:—

1. In a portable pulling device, the combination with a fixed post, of a perforated head plate and locking nuts for securing said plate to the post, a perforated base plate on the post, an anchoring stake, flexible brace members connecting said stake and said plates, a shaft rotatably supported by said plates, a winding drum on the shaft, and block and tackle mechanism operatively connected with said base plate and drum.

2. In a portable pulling device the combination with a fixed post, of a perforated head plate secured on said post, a perforated flange on said plate, a perforated base plate, a pair of anchoring stakes alined with said post, a brace chain connecting said stakes with the perforated flange, a link connecting said base plate with an adjacent stake, a rotatable shaft and its drum supported by said plates, and operatively connected block and tackle.

In testimony whereof I affix my signature.

WILLIAM R. RUTHERFORD.